Oct. 15, 1968 W. F. BIBBINGS 3,406,339
ELECTROMAGNETIC METER CONSTRUCTION
Filed Aug. 19, 1963 4 Sheets-Sheet 1

INVENTOR.
WILLIAM F. BIBBINGS
BY
OSTROLENK, FABER, GERB & SOFFEN
ATTORNEYS

INVENTOR.
WILLIAM F. BIBBINGS
BY
OSTROLENK, FABER, GERB & SOFFEN
ATTORNEYS

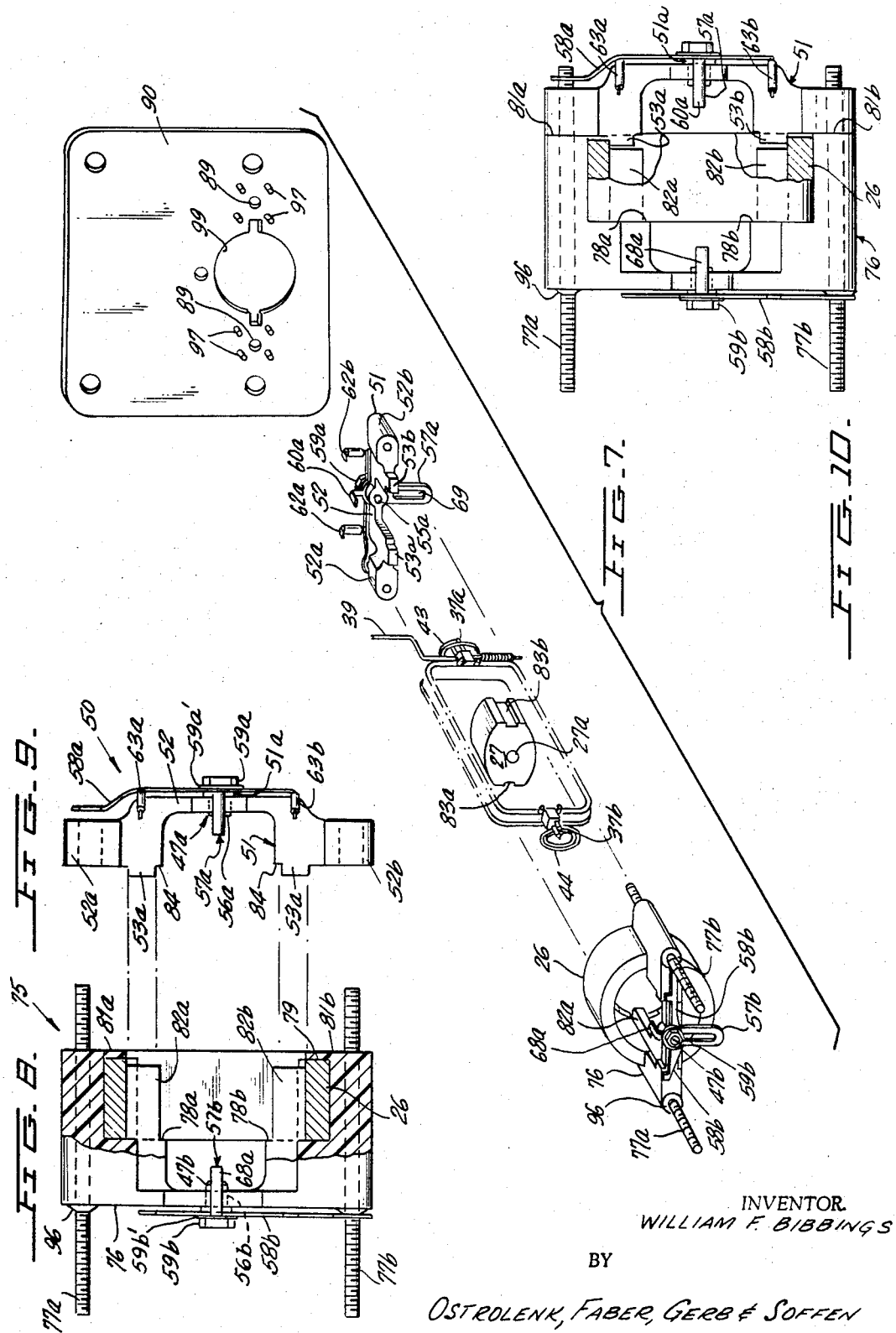

United States Patent Office

3,406,339
Patented Oct. 15, 1968

3,406,339
ELECTROMAGNETIC METER CONSTRUCTION
William F. Bibbings, Battle Creek, Mich., assignor to Kal-Equip Company, Inc., Otsego, Mich., a corporation of Michigan
Filed Aug. 19, 1963, Ser. No. 303,089
9 Claims. (Cl. 324—151)

This invention relates to electrical measuring instruments in general and more particularly to a novel construction for a moving coil meter adapted to measure direct current.

In the prior art it has been customary to construct moving coil meters with the coil wound on a bobbin made by working a short length of metal tubing. The tubing is initially round and then is deformed into a rectangular cross section. Further, deformation is required to provide outwardly extending flanges which define boundary walls to confine the coil. This method of fabrication has proven very costly and time consuming especially when close tolerances must be maintained.

The instant invention overcomes this difficulty of the prior art by providing a bobbin constructed of molded plastic material such as Delrin. The plastic molding process is much less expensive than the process of forming a bobbin from metal tubing. Further, molding enables indexing forms to be provided more readily than can be provided with worked metal tubing. In addition, the plastic material produces a light weight bobbin and since the plastic is resilient, it more readily absorbs shock than the traditional metal bobbin.

In a direct current meter movement, it is necessary to provide a damping means so as to prevent too rapid a movement of the indicating pointer. In the prior art, damping was often achieved by utilizing the conducting properties of the coil form. However, with this method it was difficult to control the degree of damping so that it was often necessary to utilize a second shorted turn or winding wound on the bobbin. By utilizing a plastic bobbin, the shorted turn required for damping is formed by an electroplating process which deposits a thin film of metal on the plastic bobbin. The resistance of the metal film is readily controlled by controlling the thickness of the deposit. Hence, the degree of damping is readily controllable.

As will hereafter be explained in detail, the meter construction provided by the instant invention includes many assemblies formed by utilizing insert molding techniques. Because of this, a number of tedious assembly operations heretofore required have been eliminated and the resulting structure is superior to prior art constructions of this type. Further, the extensive use of molded plastic members reduces insulating problems to a minimum.

In the meter of the instant invention the face plate is a member molded of plastic material rather than the conventional stamped metal with a painted surface. The color of the face plate is a permanent part of the plastic material so that it is substantially unaffected by aging. Further, by molding the face plate, locating apertures and projections may readily be formed in a single operation.

Accordingly, a primary object of this invention is to provide a novel construction for a direct current meter movement.

Another object is to provide a novel construction for a bobbin which carries the moving coil of a meter movement.

Still another object is to provide a novel means for forming the shorted turn required for damping of a meter movement.

A further object is to provide a novel meter construction which includes many subassemblies formed by utilizing insert molding techniques.

A still further object is to provide a novel meter construction in which the face plate is constructed of a molded plastic material.

These as well as further objects of this invention shall become readily apparent after reading the following description of the accompanying drawings in which:

FIGURE 7 is an exploded perspective showing the relationship between the main subassemblies constituting the meter of FIGURE 1.

FIGURE 8 is a plan view of the rear bridge assembly with a portion of the magnetic ring cut away to reveal details of the plastic formations.

FIGURE 9 is a plan view of the front bridge assembly.

FIGURE 10 is a plan view with certain elements partially cut away to show the cooperating relationship between the elements in the assemblies of FIGURES 8 and 9.

Figure 1:
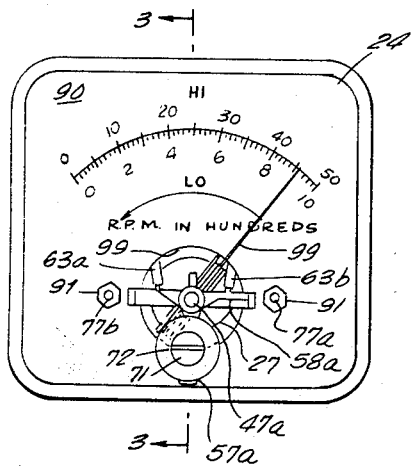
FIGURE 1 is a front elevation of a meter constructed in accordance with the teachings of the instant invention.
Figure 2:
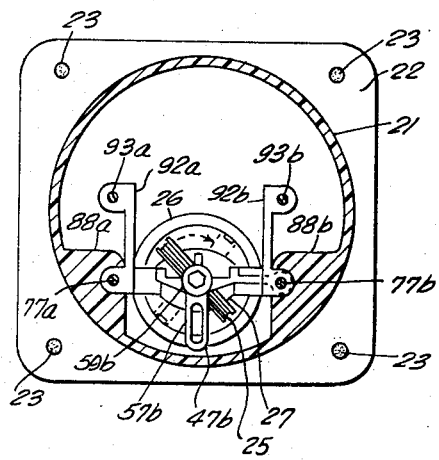
FIGURE 2 is a rear view of the meter illustrated in FIGURE 1 taken through line 2—2 of FIGURE 3, looking in direction of arrows 2—2.
Figure 3:
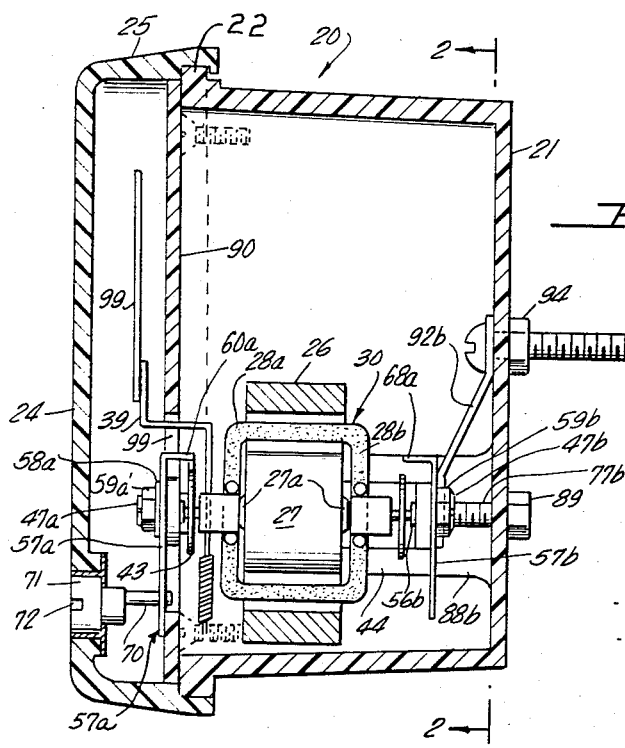
FIGURE 3 is a cross section taken through line 3—3 of FIGURE 1, looking in the direction of arrows 3—3.

Now, referring to the figures and more particularly to FIGURES 1-3. Meter 20 is provided with molded plastic housing 21 cylindrical. Generally rectangular flange 22, formed integrally with housing 21, is provided with panel mounting screws 23 at the corners thereof with screws 23 being secured to housing 21 by utilizing insert molding techniques in the formation of housing 21. Transparent rectangular front cover 24, having skirt 25, is snapfitted to flange 22.

The movement of meter 20 is of the moving coil type whose electrical operation is in accordance with well known principles of electromagnetism. Meter action is accomplished through the placement of current carrying coil 25 in the annular space formed between magnetic ring 26 and permanent magnet 27 in a manner well known to the art. Coil 25 is part of rotor assembly 30 illustrated in FIGURE 6D. The steps of forming assembly 30 are illustrated in FIGURES 6A through 6D.

Figure 6A:
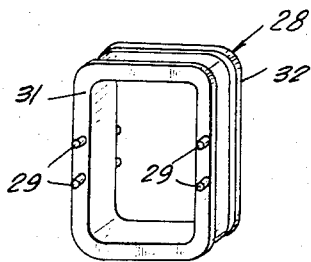
FIGURES 6A through 6E are perspective views illustrating the various steps in the formation of the movable portion of the meter, beginning with the bare molded bobbin.
Figure 6D:
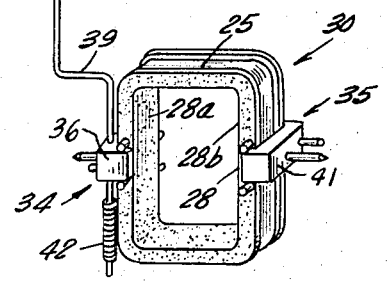

FIGURE 6A illustrates bobbin 28 constructed of molded plastic material such as Delrin. Bobbin 28 is in the form of a generally rectangular ring having axially spaced peripheral flanges 31 and 32 defining a depression wherein coil 25 is disposed. Axially extending formations 29 project from flanges 31, 32 for a purpose which will hereinafter become apparent.

Figure 6B:
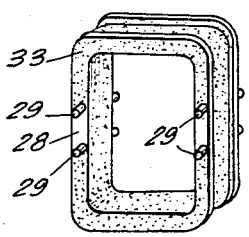

In FIGURE 6B, bobbin 28 is shown as being substantially covered by a copper coating 33. An electroplating process is utilized for depositing coating 33 and controlling the thickness thereof. Coating 33 is a shorted turn constituting the damping means for meter 20.

Figure 6E:
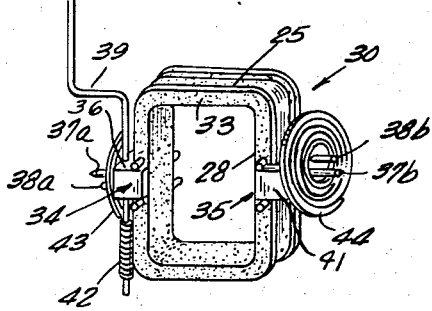
Figure 6C:
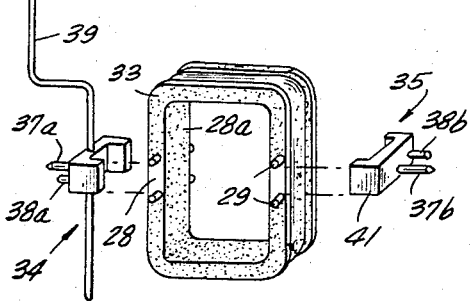

FIGURE 6C shows pivot assemblies 34 and 35 which are to be mounted to bobbin 28. Front pivot assembly 34, formed by utilizing an insert molding technique, includes a U-shaped molded plastic member 36. Pivot pin 37a and anchor pin 38a extend forwardly from the web of member 36 while pointer mounting member 39 extends through the web of member 36 parallel to leg 28a of bobbin 28.

Rear pivot assembly 35 is similar in construction to front pivot assembly 34 and consists of plastic molded U-shaped member 41 which carries pivot pin 37b and spring anchor pin 38b. Elements 37b and 38b extend rearwardly from the web of member 41. Front pivot assembly 34 is mounted directly to leg 28a of bobbin 28 with the arms of member 36 being positioned outboard of flanges 31 and 32 and being cemented thereto. In a similar manner, rear pivot assembly 35 is mounted to leg 28b of bobbin 28. It is noted that formations 29 serve to locate members 36 and 41 with respect to bobbin legs 28a and 28b.

Figure 11:
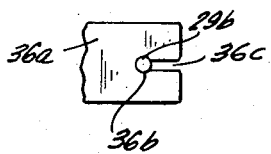
FIGURE 11 is a fragmentary side view illustrating an alternate mounting of the pivot assemblies to the bobbin.

Rather than cement the pivot assemblies in place, they may be snapfitted by utilizing the construction illustrated in FIGURE 11. FIGURE 11 shows arm 36a of a pivot assembly U-shaped molded member as being provided with circular aperture 36b which is joined to the free edge of arm 36a by slot 36c. The diameter of aperture 36b is slightly greater than the width of slot 36c. Arm 36a is constructed of a plastic material which is flexible enough to permit the boundary walls of slot 36c to spread and thereby permit locating projection 29a to pass therethrough into aperture 36b where it is captured. Projection 29a is formed as part of the coil carrying bobbin. As will hereinafter become apparent, when the meter is assembled there will not be any forces present tending to move projection 29a through slot 36c.

It is noted that the pivot assemblies of the instant invention are secured directly to the bobbin rather than being cemented to the outside of the moving coil as in the prior art. The first advantage resulting is that the free ends of the pivot pins are spaced apart by a distance which is readily controlled. In the prior art precise control of this distance was practically impossible since it was difficult to maintain a uniform outer diameter for the coil. Secondly, with the construction of the instant invention turns may be added to or subtracted from the coil for particular applications without the necessity of changing any of the other meter elements. This is possible since the webs of members 36 and 41 do not rest against the coil.

After pivot assemblies 34 and 35 are mounted to bobbin 28 (FIGURE 6D) a counterbalancing weight in the form of coil spring 42, having a kink at the center thereof, is mounted to the lower portion of pointer mounting member 39 with the axial position of spring 42 determining its effectiveness as a counterweight in a manner well known to the art.

Figure 5:
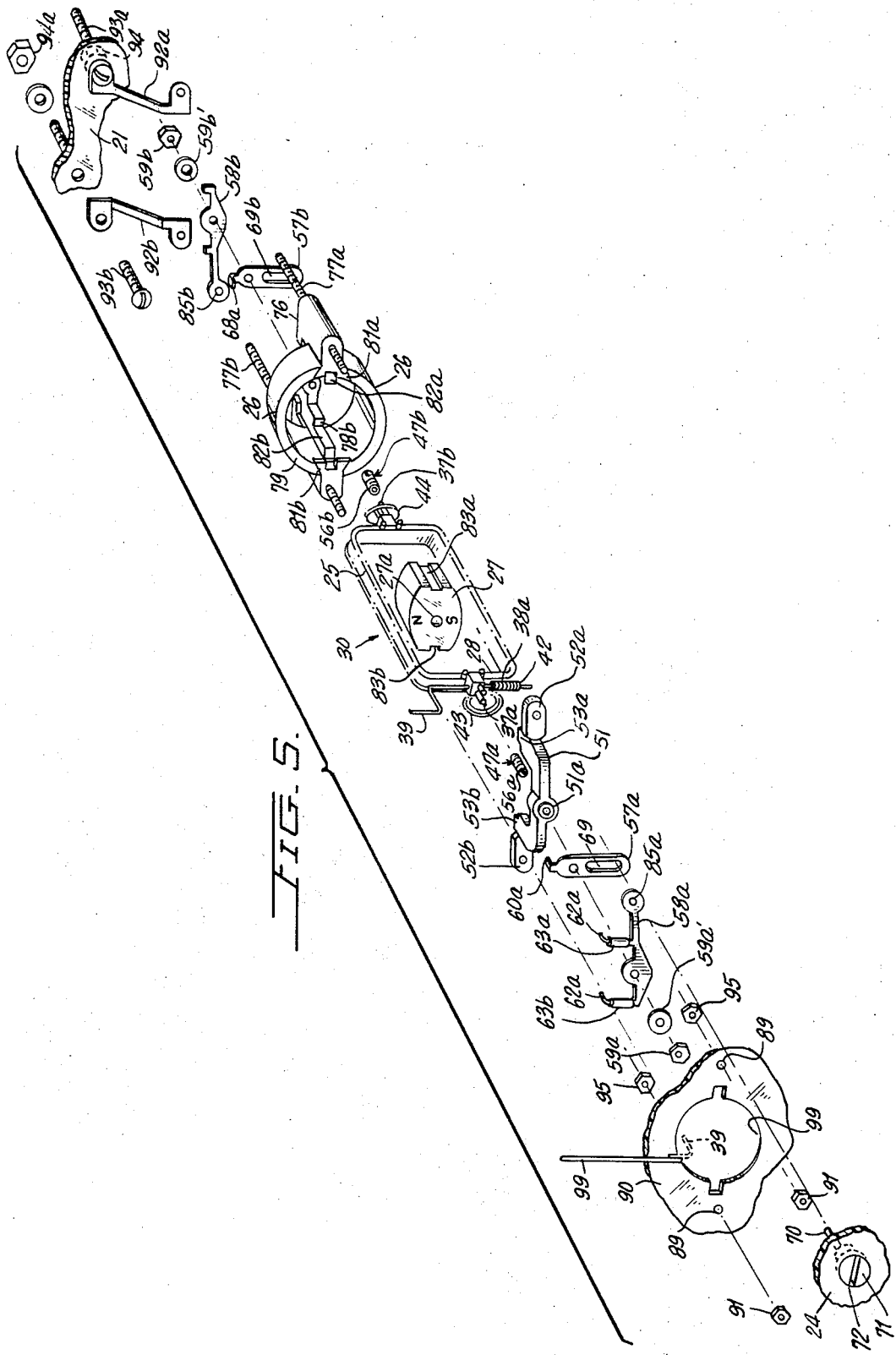
FIGURE 5 is an exploded perspective of the main operating elements constituting the meter of FIGURE 1.

As shown in FIGURE 6E, the inner ends of springs 43 and 44 are secured to anchor pins 38a and 38b respectively. Springs 43 and 44 constitute the means for restoring rotor assembly 30 to a neutral position in a manner well known to the art. Pivot pins 37a and 37b are engaged by jewel screw assemblies 47a and 47b respectively. Assembly 47a is part of front bridge assembly 50 illustrated in FIGURE 9. Assembly 50 includes a molded plastic bridge member 51 (FIGURES 5, 7, 9 and 10) having a generally U-shaped central portion 52 with outwardly extending ends 52a, 52b, each having a clearance aperture extending therethrough. The free ends of the U arms are provided with rearwardly extending locating projections 53a and 53b for a purpose to be hereinafter explained.

Front jewel assembly 47a extends through a threaded aperture located at the center of the web of the U-shaped portion 52 and is initially positioned by virtue of the fact that an insert molding technique is utilized to form bridge 51 with jewel screw assembly 47a in place. By utilizing an insert molding technique it is not necessary to drill and tap a hole in bridge member 51 for jewel screw assembly 47a and the accurate placement of jewel screw assembly 47a is assured. Jewel 55a disposed within a depression at the rear end of screw 56a constitutes the bearing support for front pivot pin 37a.

Regulator 57a and conducting strap 58a are mounted to screw 56a forwardly of bridge member 51 and are held in place by means of nut 59a and a wave spring washer 59a'. Bridge member 51 is provided with shoulder 51a surrounding the threaded aperture through which jewel screw assembly 47a extends. Shoulder 51a provides a bearing surface about which regulator 57a and strap 58a are positioned, and a jam surface for nut 59a to prevent nut 59a from loosening.

Strap 58a is provided with upwardly extending bumper support portions 62a and 62b upon which are mounted ceramic tubes 63a and 63b respectively. Bumper portions 62a and 62b are bent rearwardly so as to be positioned to engage pointer mounting 39 and thereby limit the movement of rotor assembly 30. Ceramic bumpers 63a and 63b are hard and non-magnetic so that rebound and static problems are substantially eliminated.

Regulator 57a is provided with elongated slot 69 which receives pin 70 eccentrically mounted to member 71 (FIGURES 1, 3 and 5) which is rotatably mounted to cover 24. Member 71 is provided with slot 72 to receive a screwdriver for the purpose of zero setting meter 20, as will hereinafter become apparent. Thus, it is seen that as member 71 is rotated the action of pin 70 in slot 69 causes front regulator 57a to rotate about shoulder 60a. The outer end of spring 43 is secured to tab 60a of regulator 57a.

Figure 4:
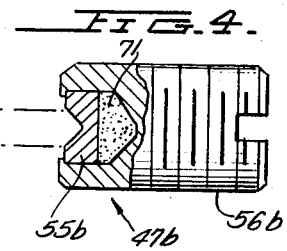
FIGURE 4 is a longitudinal cross section showing the manner in which a jewel bearing and its resilient cushion are mounted to an adjusting screw.

As seen in FIGURE 4, rear jewel screw assembly 47b consists of screw 56b having a cavity in its forward end wherein jewel bearing 55b and resilient pad 71 are retained. The V-notch in the forward end of jewel 55b receives pivot pin 37b of rear pivot assembly 35.

Rear jewel screw assembly 47b is part of rear bridge assembly 75 (FIGURES 5, 7, 8 and 10). Assembly 75 includes plastic molded U-shaped member 76 having screw 56b extending through the web thereof with rear regulator 57b and rear strap 58b being mounted to screw 56b to the rear of member 76. Nut 59b and spring washer 56b' secure regulator 57b and strap 58b in place. Studs 77a and 77b extend longitudinally through the arms of U-shaped member 76, projecting at both ends thereof for a purpose to be hereinafter explained.

Ring 26 extends through the arms of member 76 and is positioned with its circular axis extending through the longitudinal axis of screw 56b. Forward surface 79 of ring 26 is provided with V-notches which cooperate with complementary formations of member 76 to form a lock which prevents the arms of member 76 from bending outwardly when the plastic material is cooling. It is noted that portions of member 76 extend forwardly of ring surface 79 (FIGURE 8) to provide seating surfaces 81a, 81b against which front bridge assembly 50 rests. By utilizing this construction, greater accuracy is obtained since the locations of surfaces 81a and 81b are more accurately controlled than is the position of ring surface 79. Keying formations 82a and 82b of member 76 are positioned within ring member 26 and, as will hereinafter become apparent, are provided to position magnet 27. It is noted that rear jewel screw assembly 47b, studs 77a and 77b and ring 26 are positioned relative to plastic bridge member 76 by utilizing an insert molding technique.

The accurate positioning of jewel screw assemblies 47a and 47b as well as the accurate positioning of pivot pins 37a and 37b simplifies final adjustments in that quite often no jewel screw adjustment is required. When adjustment is required, it is always very slight.

Permanent magnet 27 is a molded member which is somewhat oval in shape and magnetized across its smaller diameter as indicated in FIGURE 5. The oval surfaces of magnet 27 cooperate with the circular inner surface of magnetic pole ring 26 to form an air gap which is of greatest width at the pole regions with this width gradually decreasing to a minimum at the regions most remote from the poles. This produces a substantially uniform flux distribution with the air gap. The flat surfaces of magnet 27 are each provided with a central rounded projection 27a which are positioned so as to limit the movement of rotor assembly 30 under shock conditions. However, the limited areas of projections 27a permits magnet 27 to be readily inserted into bobbin 28 with the flat surfaces of magnet 27 lying parallel to legs 28a and 28b of bobbin 28.

Slots 83a and 83b in the oval surface of magnet 27 received formations 82a and 82b of member 76 to secure magnet 27 against rotation and also receive extensions 53a of front bridge member 51.

Rearward movement of magnet 27 is limited by surfaces 78a and 78b of member 76 (FIGURE 8) while forward movement of magnet 27 is limited by surfaces 84 of front bridge member 51 (FIGURE 9). The outer end of spring 44 is secured to tab 68a of rear regulator 57b. Stub 77b extends through clearance aperture 85b of strap 58b while the forward end of stud 77a extends through clearance aperture 85a of straps 58a. In addition, the forward ends of stud 77a and 77b extend through the clearance apertures in the outward extensions 52a and 52b, and are received by nuts 95 (FIGURE 5) which mechanically secure assemblies 50 and 75 to each other.

Internal formations 88a and 88b of housing 21 (FIGURE 2) are provided with guide slots to receive the arms of bridge member 76 and are also provided with clearance apertures through which the rear ends of studs 77a and 77b extend. The portions of studs 77a and 77b extending externally of housing 21 at the rear thereof are engaged by nuts 89 to mechanically secure the meter movement to housing 21. Studs 77a and 77b may be extended even more rearwardly beyond nuts 89 (FIGURE 3) to provide electrical connecting points to the external circuit.

Straps 92a and 92b (FIGURES 2, 3 and 5), disposed interially of housing 21, connect the rear portions of studs 77a and 77b to terminal screws 93a and 93b, respectively. The latter extend externally of housing 21 and are secured in position by nuts 94. The electrical connection from terminal screw 93b to one end of coil 25 is as follows: terminal screw 93b, strap 92b, strap 58b, regulator 57b, spring 44 and rear spring anchor pin 38b to which one end of coil 25 is connected. The other end of coil 25 is connected to front anchor pin 38a. The electrical connection between pin 38a and terminal screw 93a is as follows: anchor pin 38a, spring 43, front regulator 47a, strap 58a, screw 95, stud 77a and strap 92a to terminal screw 93a. In order to assure good electrical contact between stud 77a and strap 92a, stud 77a is formed with flange 96 (FIGURES 7 and 8) against which strap 92a bears.

Face place 90 (FIGURES 1, 3, 5 and 7) is mounted forward of housing flange 22 by nuts 91 which engage the forward ends of studs 77a and 77b extending through clearance apertures 89 in face plate 90. Plate 90 is also provided with aperture 99 through which front regulator 57a and the forwardly offset portion of pointer mounting member 39 extend.

Pointer 99 is secured to the forwardly offset portion of member 39 so as to be disposed in front of the scale on the front surface of face plate 90. Projecting rearwardly from the rear surface of plate 90 are a series of indexing formations 97 which accurately position face plate 90 with respect to the other elements of the meter movement.

Plate 90 is a molded plastic member with suitable coloring pigment added to the molding material. By molding plate 90 the indexing formations 97 are readily formed and by adding coloring pigment to the molding material the color of plate 90 will remain unchanged over an extended period of time.

Thus, this invention provides a novel construction for a direct current actuated meter of the moving coil type. In particular, this invention provides a novel construction for the coil bobbin, including a molded bobbin with a metalized deposit forming a shorted damping turn. Pivot assemblies are secured directly to the bobbin rather than being mounted to the coil as in prior art construction to accurately position the pivot pins and enable relatively wide latitude in coil diameter without changing other elements.

Further, the construction set forth in the instant invention utilizes insert molding techniques to provide many novel subassemblies which materially contribute to reduced costs of components and assembly.

Although I have described preferred embodiments of my novel invention, many variations and modifications will now be apparent to those skilled in the art, and I prefer therefore to be limited not by the specific disclosure herein but only by the appended claims.

The embodiments of the invention in which an exclusive privilege or property is claimed are defined as follows:

1. A moving coil type meter including a movable means comprising a coil, fixed means comprising a permanent magnet generating a flux field wherein said coil is disposed, pivotal support means for said movable means, a housing wherein said movable means and said fixed means are disposed, terminal means electrically connected to said coil and extending externally of said housing for connecting said coil to an energizing means; said movable means also comprising a plastic bobbin upon which said coil is wound; damping means provided by a metalized deposit formed directly on said bobbin and a pair of spaced pivot sub-assemblies mounted directly on said bobbin; each of said pivot subassemblies including a molded plastic mounting member having insert molded thereon, a pivot pin and spring anchor means.

2. A meter as set forth in claim 1 in which there is a pointer carrying member insert molded in the mounting member of one of said pivot sub-assemblies.

3. A moving coil type meter as set forth in claim 1 with said fixed means including a first and a second sub-assembly including respective first and second molded plastic elements; said pivotal support means comprising first and second bearing screw means in axial alignment along a pivot axis for said movable means and insert molded to said first and second molded plastic elements, respectively.

4. A meter as set forth in claim 3 in which there is a regulator pivotally mounted to each of said bearing screw means; friction means mounted to each of said bearing screw means for maintaining said regulators in adjusted positions, a bumper means mounted to said first bearing screw means; said movable means further comprising a pointer; said bumper means comprising spaced sections positioned to limit movement of said pointer to an arc less than 180° defined by spacing of sections.

5. A meter as set forth in claim 3 in which said first element is U-shaped; mounting studs insert molded in said first element positioned parallel to said pivot axis, extending longitudinally through the U-arms and projecting beyond both ends thereof; said second element having spaced clearance apertures through which said studs extend; a face plate secured to said studs at first ends thereof and retaining means engaging the other ends of said studs to secure said fixed means to said housing.

6. A meter as set forth in claim 5 in which said fixed means also comprises a ring constructed of material having a relatively high permeability to magnetic flux, said pivot axis extending through said ring, said ring being insert molded to said first element and extending through said U-arms between said mounting studs.

7. A meter as set forth in claim 6 in which said U-arms are formed with formations disposed within said ring and engaging cooperating formations of said permanent magnet to operatively position the latter within said ring.

8. A meter as set forth in claim 7 in which the permanent magnet is generally oval having major and minor axes positioned at right angles to said pivot axis and intersecting thereat, said permanent magnet being magnetized parallel to said minor axis, said cooperating formations of said permanent magnet being disposed at opposite ends of said major axis.

9. A meter as set forth in claim 7 in which said ring is provided with depressions in an end surface thereof and said U-arms having end portions occupying said depressions in interlocking cooperation to prevent separation of said U-arms from said ring.

References Cited

UNITED STATES PATENTS

| | | | |
|---|---|---|---|
| 392,385 | 11/1888 | Weston | 324—144 |
| 1,927,346 | 9/1933 | Lawrence | 324—151 X |
| 2,332,877 | 10/1943 | Villard | 324—155 |
| 2,388,897 | 11/1945 | Ammon | 324—155 |
| 2,425,595 | 8/1947 | Butler | 324—155 X |
| 2,431,444 | 11/1947 | Adams | 324—151 X |
| 2,517,171 | 8/1950 | Bernreuter | 324—151 X |
| 2,556,816 | 6/1951 | Lukacs | 335—222 |

RUDOLPH V. ROLINEC, *Primary Examiner.*

P. A. URIBE, *Assistant Examiner.*